US006493180B1

(12) United States Patent
Kang et al.

(10) Patent No.: US 6,493,180 B1
(45) Date of Patent: Dec. 10, 2002

(54) HARD DISK DRIVE COVER THAT CONTAINS A HELMHOLTZ RESONATOR WHICH ATTENUATES ACOUSTIC ENERGY

(75) Inventors: Seong-Woo Kang, Santa Clara, CA (US); Wilson Long, San Jose, CA (US); Tai-Yeon Hwang, Santa Clara, CA (US)

(73) Assignee: Samsung Electronics Co., Ltd. (KR)

( * ) Notice: Subject to any disclaimer, the term of this patent is extended or adjusted under 35 U.S.C. 154(b) by 30 days.

(21) Appl. No.: 09/593,181

(22) Filed: Jun. 13, 2000

Related U.S. Application Data

(60) Provisional application No. 60/149,943, filed on Aug. 19, 1999.

(51) Int. Cl.⁷ .............................................. G11B 33/14
(52) U.S. Cl. ................................................... 360/97.02
(58) Field of Search ..................................... 360/97.02

(56) References Cited

U.S. PATENT DOCUMENTS 5,282,100 A * 1/1994 Tacklind .................. 360/97.02
5,781,373 A * 7/1998 Larson .................... 360/97.02
6,243,262 B1 * 6/2001 Koo ........................... 361/687

* cited by examiner

Primary Examiner—A. J. Heinz
(74) Attorney, Agent, or Firm—Irell & Manella LLP; Jeffrey P. Aiello

(57) ABSTRACT

A disk drive housing that can attenuate noise. The housing may include a first layer that is attached to a second layer, and a gap located between the first and second layers. The layers and gap may be configured to attenuate acoustic energy within a relatively broad frequency range.

11 Claims, 2 Drawing Sheets

HARD DISK DRIVE COVER THAT CONTAINS A HELMHOLTZ RESONATOR WHICH ATTENUATES ACOUSTIC ENERGY

CROSS-REFERENCE TO RELATED APPLICATION

The present application claims benefit of U.S. Provisional Application No. 60/149,943, filed Aug. 19, 1999.

BACKGROUND OF THE INVENTION

1. Field of the Invention

The present invention relates to a hard disk drive that has an integrated Helmholtz resonator which attenuates noise generated by the drive.

2. Prior Art

Hard disk drives contain a plurality of transducers that are coupled to magnetic disks. The transducers can read and write information by magnetizing and sensing the magnetic fields of the disks, respectively. The disks are rotated by a spindle motor that is mounted to a base plate.

The transducers are typically integrated into heads that are mounted to corresponding flexure arms. The flexure arms are attached to an actuator arm that is mounted to the base plate. The actuator arm includes a voice coil motor that can move the transducers across the surfaces of the disks. The voice coil motor allows the transducers to access information located within different radial tracks of the disks. The disks, spindle motor and actuator arm are all enclosed by a cover that is attached to the base plate.

The spindle motor and voice coil motor generate noise that is transmitted into the environment through the cover and the base plate of the drive. The spindle motor may also create vibration that is converted into acoustic noise and emitted by the drive. Additionally, the rotating disks create a flow of air that may generate fluid perturbations and resultant acoustic noise. Acoustic noise is undesirable particularly when the disk drive is assembled into a consumer product such as a computer or a digital video recorder.

Co-pending application Ser. No. 09/585,914 discloses a hard disk drive housing that attenuates acoustic noise generated by the disk drive. The housing includes multiple layers that can be designed to create a transfer function that attenuates, or rolls off, acoustic noise within a range of frequencies. The bandwidth of the metal laminate acoustic filter is relatively narrow. It would be desirable to provide a hard disk drive that attenuates the noise generated by the drive in a relatively broad bandwidth. It would be desirable to attenuate the noise without significantly increasing the size of the hard disk drive or the cost of producing the hard disk drive.

BRIEF SUMMARY OF THE INVENTION

One embodiment of the present invention is a disk drive housing that can attenuate noise. The housing may include a first layer that is attached to a second layer, and a gap located between the first and second layers. The layers and gap may be configured to attenuate acoustic energy within a relatively broad frequency range.

DETAILED DESCRIPTION OF THE INVENTION

In general the present invention provides a disk drive housing that can attenuate noise generated within the drive. The housing may be constructed to significantly attenuate, or roll off, noise within a broad range of frequencies. In one embodiment, the housing construction may include an air gap located between a pair of metal plates. The air gap and plates may form a Helmholtz resonator that attenuates acoustic noise over a relatively broad frequency range.

Figure 1:
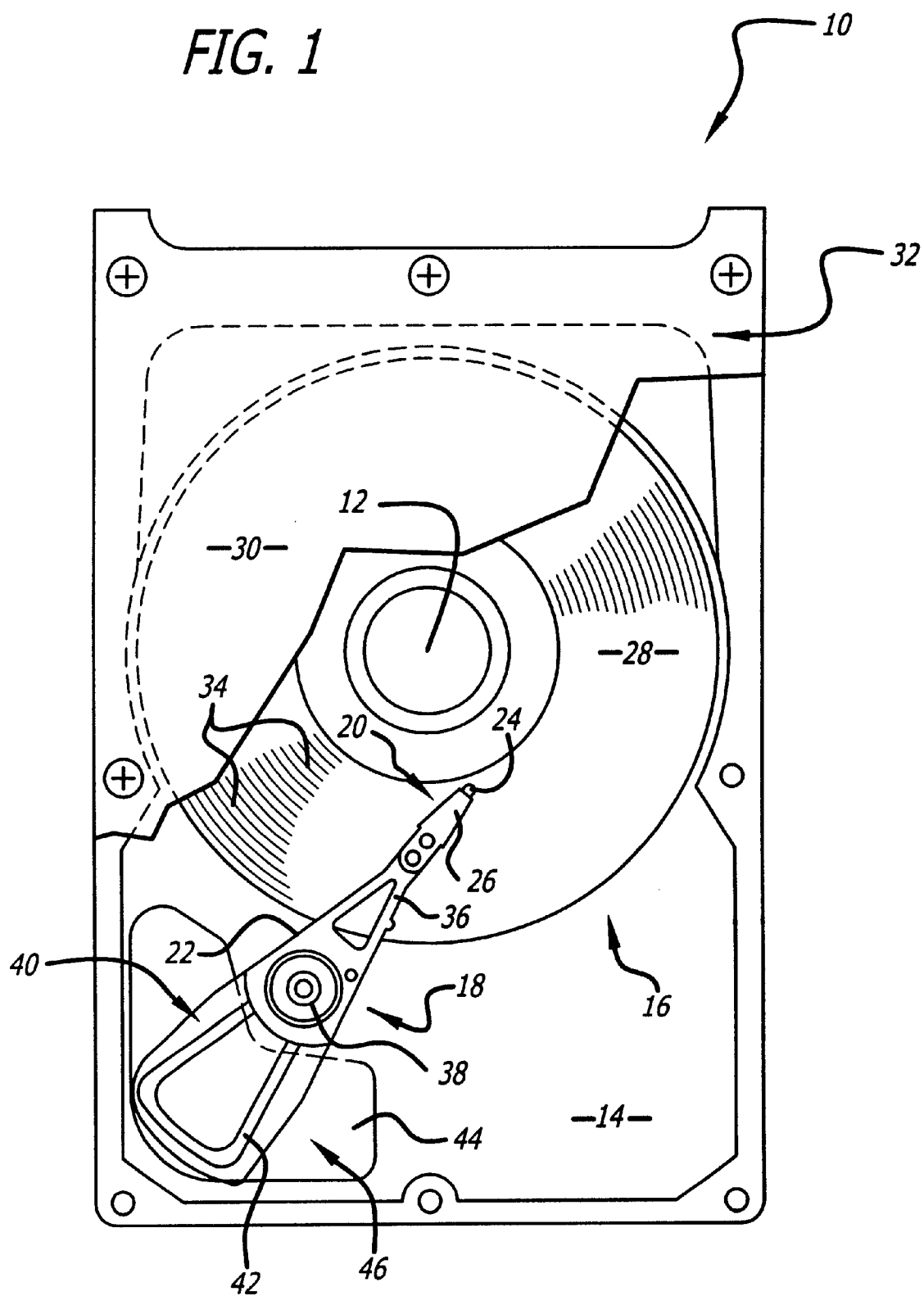
FIG. 1 is a top sectional view of an embodiment of a hard disk drive of the present invention.

Referring to the drawings more particularly by reference numbers, FIG. 1 shows an embodiment of a hard disk drive of the present invention. The disk drive 10 may include a spindle motor 12 that is mounted to a base plate 14. The spindle motor 12 rotates a plurality of disks 16. The disks 16 rotate relative to an actuator arm assembly 18. The actuator arm assembly 18 includes a plurality of head gimbal assemblies 20 that are attached to an actuator arm 22. Each head gimbal assembly 20 may include a head 24 that is gimbal mounted to a suspension arm 26. Each head 24 is magnetically coupled to a disk surface 28. The disks 16 and actuator arm assembly 18 may be enclosed by a cover plate 30 that is attached to the base plate 14. The cover 30 and base 14 plates form a disk drive housing 32.

Each head 24 may include a write element (not shown) and a read element (not shown) that are coupled to an electronic circuit(s) (not shown). The circuit and read/write elements can magnetize and sense the magnetic field of each disk surface 28 to store and retrieve data within the disk drive. The data is typically stored within sectors that extend along annular tracks 34 of the disks 16. Each head 24 typically includes an air bearing surface that cooperates with an air flow created by the rotating disks 16 to create an air bearing between the head 24 and the disk surface 28. The air bearing prevents contact and wear between the disks 16 and the heads 24.

The actuator arm 22 may include a plurality of individual arms 36 that are separated by slots (not shown) which allow the disks 16 to spin between the arms 36. The actuator arm 22 may be pivotally mounted to the base plate 14 by a bearing assembly 38.

The actuator arm 22 may further have a voice coil portion 40 that supports a voice coil 42. The voice coil 42 may be coupled to a magnet assembly 44 and a driver circuit (not shown). The coil 42 and magnet assembly 44 are commonly referred to as a voice coil motor 46. When excited by the driver circuit the voice coil 42 cooperates with the magnet assembly 44 to create a torque that rotates the actuator arm 22 relative to the base plate 14. The pivotal movement of the actuator arm 22 moves the heads 24 across the disk surfaces 28 to access different tracks of the disks 16.

The disk drive 10 may generate acoustic noise that is transmitted into the housing 32. In particular, the spindle motor 12 and voice coil motor 46 may generate noise that is transmitted into the housing 32. Additionally, mechanical vibration from the spindle motor 12 may be transferred into the housing 32 and produce an audible sound from the housing structure. Furthermore, the rotating disks 16 may create fluid perturbations that cause the housing to vibrate and emit an audible sound.

Figure 2:
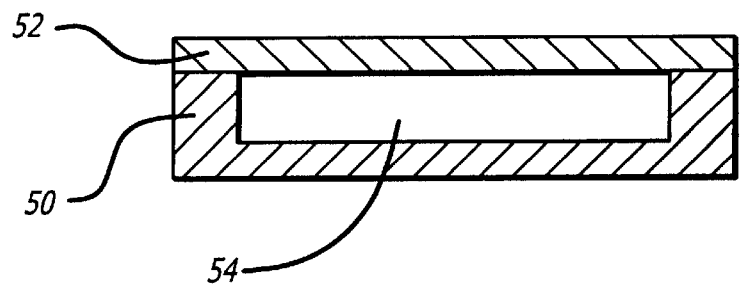
FIG. 2 is a side sectional view of the housing.

As shown in FIG. 2, the housing 32 may include a multi-layer construction designed to attenuate the noise generated by the disk drive 10. The housing 32 may be constructed to attenuate acoustic noise over a broad band of frequencies. The housing 32, including the cover 30 and/or the base plate 12, may include a first layer 50 that is attached to a second layer 52 and a gap 54 that is located between the first 50 and second 52 layers. The gap 54 may be filled with air and/or a layer of sound absorbing material.

The different layers may be designed to create a Helmholtz resonator that attenuates, or rolls of, a certain frequency band of acoustic noise. By way of example, the Helmholtz resonator may attenuate acoustic noise ranging from 0 to 4000 hertz (Hz), noise typically generated by a hard disk drive 10.

Figure 3:
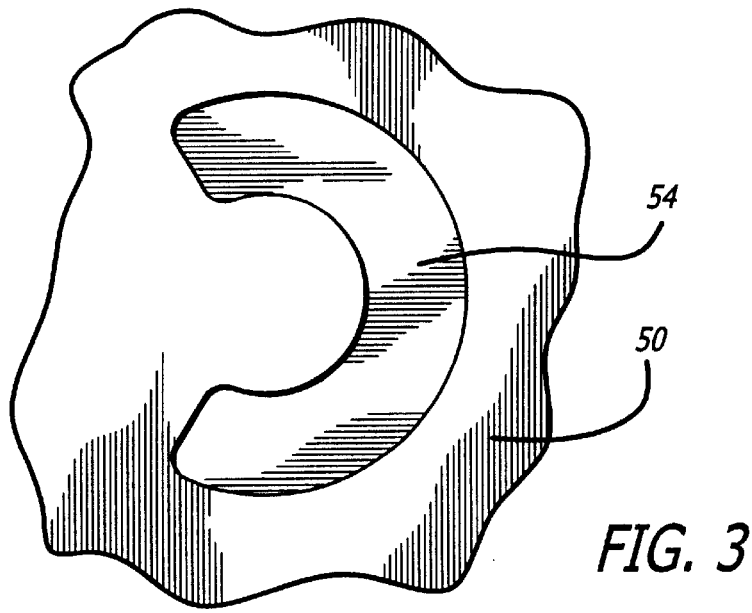
FIG. 3 is a top sectional view showing one embodiment of a gap in a hard disk drive housing; and, FIG. 4 is a top sectional view showing another embodiment of a gap in the hard disk drive housing.

FIG. 3 shows an embodiment of a disk drive wherein the gap 54 is shaped as a segment of a circle. This portion of the gap may be located adjacent to the disks 16 of the hard drive 10. By way of example, the gap 54 may have an area of approximately 3250 square millimeters ($mm^2$) and a thickness of approximately 12 millimeters.

Figure 4:
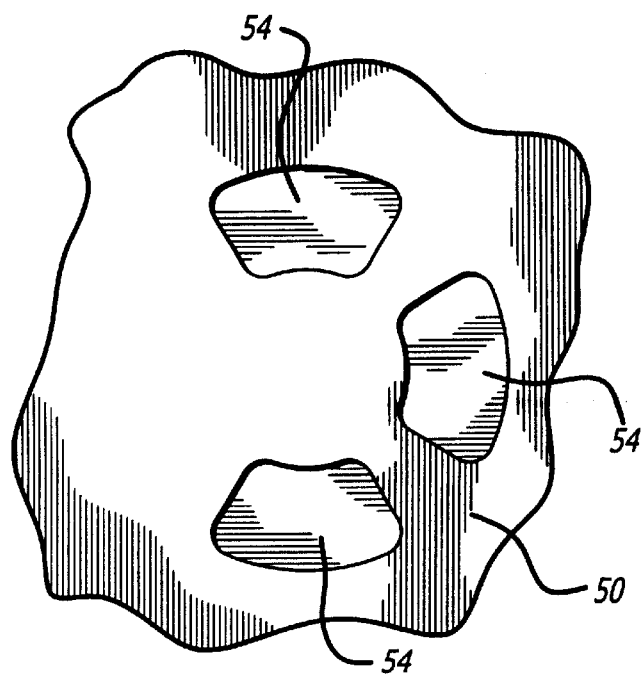

FIG. 4 shows another embodiment of a disk drive with a gap 54 divided into a plurality of individual segments. The segments can be located at various acoustic "hot spots" of the disk drive. A hot spot being a location of the disk drive that emits a significant level of acoustic noise. By way of example, each segment may have an area between 870–900 $mm^2$ and a thickness of approximately 12 mm. It being understood that the gap 54 and accompanying Helmholtz resonator can be designed into various acoustic hot spots of the disk drive.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A housing for a disk drive, comprising:

a first layer;

a second layer that is attached to said first layer; and, a gap located between said first and second layers, said gap, and said first and second layers being configured as a Hehlholtz resonator to attenuate acoustic energy.

2. The housing of claim 1, wherein said gap contains air.

3. The housing of claim 1, wherein said gap contains a sound absorbing material.

4. The housing of claim 1, wherein said gap includes a plurality of individual segments.

5. The housing of claim 1, said gap is shaped as a segment of a circle.

6. A disk drive, comprising:

a base plate;

a spindle motor mounted to said base plate;

a disk attached to said spindle motor;

an actuator arm mounted to said base plate;

a transducer coupled to said actuator arm and said disk; and, a cover attached to said base plate, said cover including a first layer and a second layer that is attached to said first layer, and a gap located between said first and second layers, said gap, and said first and second layers being configured as a Helmholtz resonator to attenuate acoustic energy.

7. The disk drive of claim 6, wherein said gap includes a plurality of individual segments.

8. The disk drive of claim 7, wherein said gap contains air.

9. The disk drive of claim 7, wherein said gap contains a sound absorbing material.

10. The disk drive of claim 6, said gap is shaped as a segment of a circle.

11. A method for designing a housing for a disk drive, comprising:

selecting a first layer that is to be attached to a second layer so that there is a gap between the layers to create a Helmholtz resonator to attenuate acoustic energy.

* * * * *